(12) United States Patent
Al-Aani, Sr.

(10) Patent No.: US 10,617,496 B2
(45) Date of Patent: Apr. 14, 2020

(54) DENTURES (FALSE TEETH) MADE PERMANENT USING VACUUM SUCTION

(71) Applicant: Qussay Abdulatteef Jasim Al-Aani, Sr., Tampa, FL (US)

(72) Inventor: Qussay Abdulatteef Jasim Al-Aani, Sr., Tampa, FL (US)

(*) Notice: Subject to any disclaimer, the term of this patent is extended or adjusted under 35 U.S.C. 154(b) by 77 days.

(21) Appl. No.: 15/928,001

(22) Filed: May 29, 2018

(65) Prior Publication Data

US 2018/0280126 A1    Oct. 4, 2018

Related U.S. Application Data

(60) Provisional application No. 62/601,634, filed on Mar. 27, 2017.

(51) Int. Cl.
*A61C 13/24* (2006.01)
*A61C 13/10* (2006.01)
*A61C 13/01* (2006.01)

(52) U.S. Cl.
CPC ............ *A61C 13/245* (2013.01); *A61C 13/10* (2013.01); *A61C 13/04* (2013.01)

(58) Field of Classification Search
CPC .............................. A61C 13/245; A61C 13/10
See application file for complete search history.

(56) References Cited

U.S. PATENT DOCUMENTS

| 3,845,558 | A | * | 11/1974 | Kelly | A61C 13/0025 433/187 |
| 3,886,659 | A | * | 6/1975 | Reifke | A61C 13/00 433/188 |
| 4,591,341 | A | * | 5/1986 | Andrews | A61C 7/08 433/187 |
| 5,242,304 | A | * | 9/1993 | Truax | A61C 7/00 433/177 |
| 2006/0228673 | A1 | * | 10/2006 | Fenc | A61C 3/00 433/188 |

FOREIGN PATENT DOCUMENTS

JP         10099350 A  *  4/1998

* cited by examiner

*Primary Examiner* — Daniel J Colilla

(57) ABSTRACT

The invention relates for producing permanent dentures without using any implants (screws) on the gum or using glue but using the vacuum of suction cells (suckers), between the natural gum and dentures, but using flexible thin plastic (approved by FDA) sheath between the gum and the dentures using suckers (similar to octopus) made on upper and lower surfaces of the sheath the upper sheath surface will have the same shape of the normal denture lower surface, similarly the lower sheath surface will have the same shape of the gum, the shape of the plastic sheath will always have the same shape of the gypsum modeled cast at the dentist clinic, for the gum surface, all the suckers will be (squeezed) pressed and create vacuum to hold the dentures to the gum and the dentures.

4 Claims, 2 Drawing Sheets

DENTURES (FALSE TEETH) MADE PERMANENT USING VACUUM SUCTION

TECHNICAL FIELD OF DISCUSSION

The present invention relates to methods and apparatus for producing permanent dentures without using any implants (screws) on the jaws bones or glue but using the vacuum of suction cells (suckers), between the natural jaws and normally made dentures but using flexible plastic (approved by FDA of USA) sheath between the jaws and the dentures using suckers (similar to octopus or Squid or leeches Suckers) made on upper and lower surfaces of the sheath surfaces.

BACKGROUND OF THE INVENTION

Dentures, also known as false teeth, are devices constructed to replace missing teeth, conventional dentures are removable (removable partial denture or complete denture). However, there are many denture designs, some which rely on bonding or gluing on to the jaws or dental implants (fixed using screws into the jaws bones).

Patients can become entirely (without teeth) for many reasons, the most prevalent being removed because of dental disease, and tooth decay.

Dentures can help patients through:
A) Chewing
B) Aesthetics, appearance to the face
C) Pronunciation, and
D) Self-esteem.

Removable partial dentures are for patients who are missing some of their teeth on a particular arch. Fixed partial dentures, also known as "crown and bridge" dentures, are made from crowns that are fitted on the remaining teeth. Complete dentures are worn by patients who are missing all of the teeth in a single arch (upper or lower) or more commonly, in both arches, upper and lower alike. The process of fabricating a denture usually begins with an initial dental impression of the maxillary and mandibles ridges. Standard impression materials are used during the process. The initial impression is used to create a simple stone model that represents the maxillary and mandibles arches of the patient's mouth. This is not a detailed impression at this stage. Once the initial impression is taken, the stone model is used to create a 'Custom Impression Tray' which is used to take a second and much more detailed and accurate impression of the patient's maxillary and mandibles ridges. A wax rim is fabricated to assist the dentist or denturist in establishing the vertical dimension of occlusion. After this, a bite registration is created to marry the position of one arch to the other.

Once the relative position of each arch to the other is known, the wax rim can be used as a base to place the selected denture teeth in correct position. This arrangement of teeth is tested in the mouth so that adjustments can be made to the occlusion. After the occlusion has been verified by the dentist or denturist and the patient, and all phonetic requirements are met, the denture is processed.

Processing a denture is usually performed using a lost-wax technique whereby the form of the final denture, including the acrylic denture teeth, is invested in stone. This investment is then heated, and when it melts the wax is removed through a sprung channel. The remaining cavity is then either filled by forced injection or pouring in the uncured denture acrylic, which is either a heat cured or cold-cured type. During the processing period, heat cured acrylics—also called permanent denture acrylics go through a process called polymerization, causing the acrylic materials to bond very tightly and taking several hours to complete. After a curing period, the stone investment is removed, the acrylic is polished, and the denture is complete.

Support principles; Support is the principle that describes how well the underlying mucosa (oral tissues, including gums) keeps the denture from moving vertically towards the arch in question during chewing, Stability; Stability is the principle that describes how well the denture base is prevented from moving in a horizontal plane, and thus sliding from side to side or front to back. Retention; Retention is the principle that describes how well the denture is prevented from moving vertically in the opposite direction of insertion. Fit, maintenance, and relining. Generally speaking partial dentures tend to be held in place by the presence of the remaining natural teeth and complete dentures tend to rely on muscular co-ordination and suction to stay in place Dentures that fit well during the first few years after creation will not necessarily fit well for the rest of the wearer's lifetime. This is because the bone and mucosa of the mouth are living tissues, which are dynamic over decades, when dentures no longer fit well; the correct action is to seek follow-up care. Using denture adhesive may improve the fit, but it tends to work better when only a small amount is used as covering the denture fitting surface in adhesive makes it stay in less well. Adhesives may compensate for gradual loosening of a denture, but it is only a temporary solution; Complications and recommendations the fabrication of a set of complete dentures is a challenge for any dentist/denturist.

A lower complete denture should or must be supported by two to four implants placed in the lower jaw for support. An implant-supported lower denture is far superior to a lower denture without implants, because: it is much more difficult to get adequate suction on the lower jaw. The functioning of the tongue tends to break that suction, and without teeth the ridge tends to resort and provides the denture less and less stability over time. It is routine to be able to bite into an apple or corn-on-the-cob with a lower denture anchored by implants. Without implants, this is quite difficult or even impossible

SUMMARY OF THE INVENTION

The present invention relates to methods and apparatus for producing permanent denture without using any implants (screws) on the jaws bones or glue but using the vacuum of suction cells (suckers), (similar to leeches or octopus and squid suckers on their arms) which work on irregular surfaces and best at wet surfaces and produce approximate pressure of 0.1 MPa (1 atm). The vacuum will be almost continuously rejuvenated due to the natural chewing of the mouth.

Each sucker can be very small in size which can be created by using a flexible plastic sheet as a sheath (plastic approved by FDA-USA) with suckers on both upper and lower surfaces with the shape of the jaws (matching the jaws and dental impression taken by the dentist) similarly with both sides (upper and lower) with the lower surface of the flexible plastic sheath matching the shape of the natural jaws and the upper sheath surface matching the lower surface of the normal denture surface, both of the flexible plastic upper and lower sheath surfaces. The sheath with upper and lower suckers will have flat straight gaps between each successive sucker and the next sucker on the upper sucker's row and lower sucker's row to make sure of vacuum created in each sucker is acting independently on the gum and denture.

DESCRIPTION THE DRAWINGS

Elements in the figures have not necessarily been drawn to scale in order to enhance their clarity and improve understanding of these various elements and embodiments of the invention.

Furthermore, elements that are known to be common and well understood to those in the industry may not be depicted in order to provide a clear view of the various embodiments of the invention; thus the drawings are generalized in form in the interest of clarity and conciseness.

FIG. 1 Very thin plastic sheath with alternative upper and lower suckers positions.

FIG. 2 Details of the suckers attachment to the gum showing the suckers sheath without the dentures.

FIG. 3 Alternative places of suckers positions on the plastic sheath,

FIG. 4 An alternative method to increase suction (like using a spring to pull-up the sheath to form increased vacuum) using bolts or thread to pull the flexible plastic sheath like the vacuum cell (suckers).

DETAIL DESCRIPTION OF THE INVENTION

The present invention relates to methods and apparatus for producing permanent dentures without using any implants (screws) on the jaws bones or glue but using the vacuum of suction cells (suckers), between the natural jaws and normally made dentures but using flexible plastic (approved by FDA of USA) sheath between the jaws and the dentures using suckers (similar to octopus or Squid or leeches Suckers) made on upper and lower surfaces of the sheath surfaces. The making of the dentures will use the same methods used with normally made denture with the usual impression taken for normal made dentures. The flexible plastic sheath will be used in-between the gum and the normal dentures and will be vacuum formed with heat & vacuum (Thermoforming method—or injection molding for very flexible plastics, mass production with sizes) to take the shape of the jaws-gum shape on one side and the shape of the normally made dentures inner (lower) side shape with suckers on both surfaces, for clarification the making of the plastic sheath will be assumed to take the shape of the jaws-gum impression on the lower side and the impression on the upper part of the sheath of the already made normal denture impression with the suckers on both upper and lower surfaces. The suckers (work very well in surfaces for octopus, leaches and squids in nature)—or in the wet mouth for the suckers on the flexible sheath and the vacuum is rejuvenated on chewing of the mouth on the sheath upper surface and lower surface of the suckers. The suckers are made in half-sphere shape like (or any suitable shape) with width or diameter nearly equal to the gum thickness with height of the (sucker height) sucker equal half-sphere approximately 1 mm to 3 mm height enough to produce suction. These suckers will be flat when squeezed and pushed by the pressure exerted on this half-sphere sucker top part and the lower part by the squeezing of both jaws in normal eating or chewing. These alternating upper suckers and lower suckers will have flat gaps between the suckers on the jaws and dentures surfaces. All upper suckers and lower suckers and the flat part in-between will all be squeezed flat when both jaws are in closed positions. When the half-sphere top will be squeezed (pushed down) vacuum will be created and suction will take place (rubber like silicon or EVA or similar flexible plastics approved by FDA-USA) and the sheath will adhere to both surfaces of the jaws and the denture surfaces with great strength.

Figure 1:
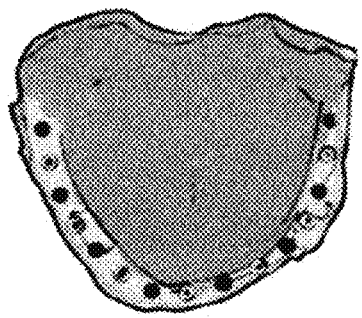
Figure 2:
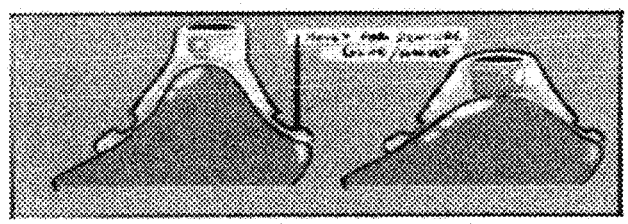
Figure 3:
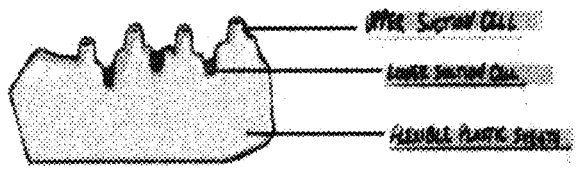
Figure 4:
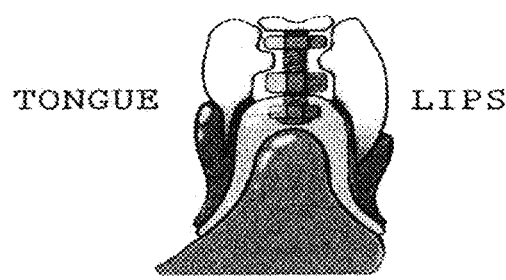

FIG. 3, these individual vacuum suction cells (suckers) on the flexible plastic sheath will fit perfectly on both sides of the jaws upper side and the lower side of the normally made dentures suckers vacuum will work on concave or curved or irregular surfaces if flexible plastic are used-see vacuum suckers tests on concave surfaces.

Figure 5A:
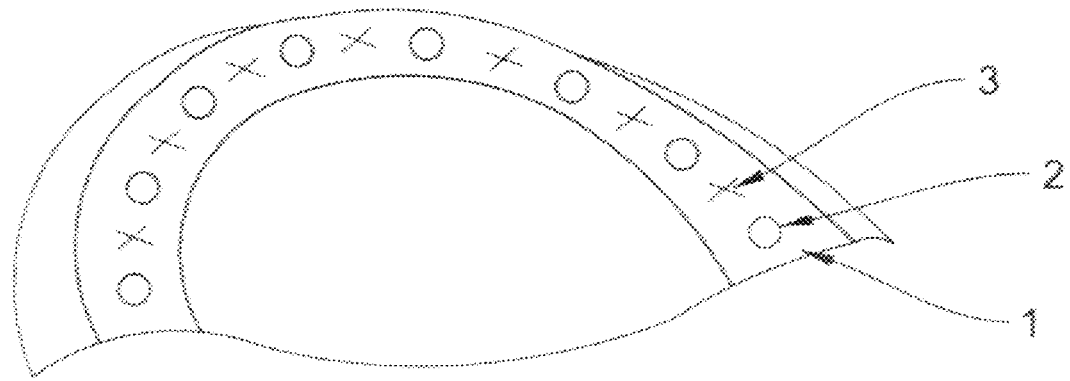
FIG. 5A Shows a plastic sheath including indications of the locations of the lower surface suckers and the upper surface suckers.
Figure 5B:
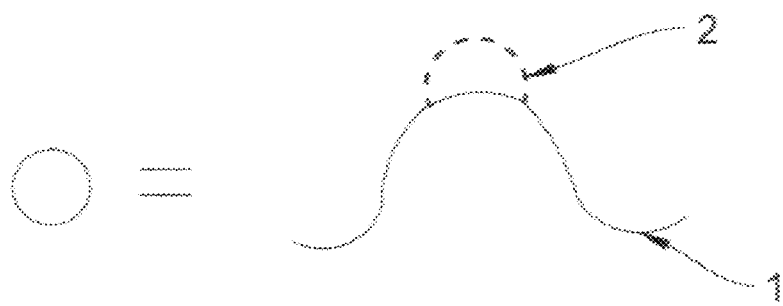
FIG. 5B Is a key showing what the X's and O's in FIG. 5A mean.
Figure 5B:
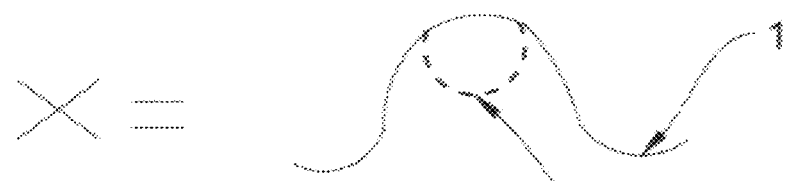

FIG. 5A shows an embodiment of a sheath 1 with the alternating locations of suction cells 2, 3. When pressed done by the jaws the suction cells 2, 3 will produce suction on both the jaws and the dentures and they will adhere to each other and this suction will be rejuvenated every time the mouth closes. FIG. 5B is a key indicating what the X's and O's mean in FIG. 5A. The X's represent the lower suctions cells 3 that are formed in a cavity created by the underside of the sheath 1 (as shown in FIG. 5A). The O's represent the upper suction cells 2 which are formed on the convex portion (or hill) on the upper side of the sheath 1 (as shown in FIG. 5A).

These flexible plastic sheets sheaths will have individual vacuum suction cells on the upper part of the sheath and individual vacuum suction cell on the lower side of the flexible sheaths. These shaped plastic sheath with its vacuum suction cells, (suckers not made yet for clarification of the principal) on its upper surface and lower surface will be made to adhere to the jaws and the normal made dentures and can be used to adhere to the upper jaw or lower jaw or to partial part of the upper or lower jaw like the bridge used in the normal individual bridge without depending on the side or adjacent teeth but completely individual and independent and depending on individual plastic suction cells suckers. These individual suction cells (suckers) can adhere to the jaws and the normal made upper denture or lower denture and the jaws gum using the suckers on both sides of the jaws and the normal denture inner part by using a plastic sheet made to fit to the jaws gum and the normal made dentures with the contours impression printed for individual upper jaws gum or lower jaws gum using the normal methods using gypsum method to get impressions for the jaws gum contour and inner part contour of the denture and the plastic sheet contour with the suction suckers in place before being pushed to produce the suction on both sides of the plastic sheath. However it should be pointed out that normal dentures made, use the suction and adhesion of the cavity made in the upper denture set use suction (not very good vacuum suction) due to the tongue and mouth suction to get the denture set adhere to the upper part of the mouth due to the special cavity made in the upper denture set and this suction and adhesion could not be done in the lower denture set and difficulties exist in fixing the lower denture to the lower jaws and it should be mentioned that this suction cavity where done in Japan around 1700s and the dentures had almost the same shape as modern dentures, and attached inside the mouth with similar suction and adhesion as done today. Patent development to increase the vacuum suction between the false teeth and the jaws gum, using bolts or threads.

An alternative method to make the false teeth permanent is to use continuous sheath without suckers like shown in for both upper and lower jaws but with bolts attached as shown and the bolts will be placed in selected teeth and not for all teeth so one suction vacuum will be independent of each other and not connected to each other so each vacuum created will be independent of each other and is to use maximum suction to be applied between the false teeth (dentures) and the natural mouth jaws using the vacuum created by the pulling up the lower part of the denture resting on the natural jaws using the screws pull up between the denture and the jaws by pulling the plastic sheath inner part but holding the outer part of the sheath attached to the jaws outer part but the sheath are held to the red acrylic gum as shown similar to the mechanical pull of the bath suction handle which has very high suction forces see test results in pictures attached. However these bolts and nuts can be discarded and replaced with circular thread stainless steel or gold or plastic nylon to be inserted in the hole in the teeth and connected to the sheath using washers or any other connectors or similar material strong enough to withstand the pulling of the sheath while holding the base of the sheath attached to the base of the natural jaws gum by pulling the thread using pulling device (say twisters) the after pulling the sheath to the predetermine required length then glue which dries quickly is applied and the thread is held by the device until dry the thread and the sheath may be up 1-2 mm above the jaws gum, the thread excess is cut off using the teeth grinder and the hole sealed using acrylic glue this will be applied for the chosen teeth may be 5-6 for each denture upper and lower jaws and the thread is cut and the denture are smoothed to be able to use the denture normally, this procedure can be used on several successive false teeth and leave several false teeth to hold the sleeves tight to the human gum so the vacuum will operate at individual teeth and pull the sleeves 2 mm or more up and on both sides of these pulled up sleeves will be pushing the sleeves on both sides with several teeth and so on to keep the vacuum individually just in case one set of vacuum or string braking, it should be noted that the clear holes do not have to be on the front face of the false acrylic teeth but may be inside on the acrylic false red gum especially for the front teeth sets then the sheath is pushed by the human jaws downward which will give it the vacuum needed if perfects contours are done on the silicon sheath or if EVA is used. It should be noted that to hold the silicon or EVA sheath can be held very tightly to the acrylic gum using click on key holding device to grip the denture to the sheath. Holes 4 on both horizontal sides of the acrylic gum to hold the sheath on both sides by melting the silicon or EVA and applied to the denture and the sleeve bottom edges only before attaching the denture and sleeve on top of natural gum, glue can be used temporarily to hold the sheath bottom to the acrylic gum if holes 4 where not made. The above procedures can be made in several teeth units with gaps in-between to give the human gum chance to breath and can be cleaned with tooth brush. These units can be connected to each other in several ways (GLUE, STEEL CONECTORS). The thread system can work on a 3 tooth group by putting the thread in the middle tooth but half of the sleeve will have a gap on both sides of the middle tooth but pressed by half the 1st and half of the 3rd tooth, (i.e. the sleeve can stretch on two tooth) but the sleeves can stretch on the middle tooth and half of the first and half of the 3rd tooth, the rest is as above. It should be noted that these vacuum suction cells (suckers) or vacuum created using bolts or threads 5, can be separated using air pressure introduced to the sheath suckers through small holes drilled—by the dentist or already made before installation of the denture and these holes will be capped by screws (acrylic or like implant screws) which can be taken out and air is pushed through these holes to release the denture attachment to the gum by removing the vacuum suctions effect on both the upper and lower surfaces when required but can be treated like implant screw on false teeth system in the long term effect, sheath with places for upper and lower made suckers in alternative mode which when pressed done by the jaws the suckers will produce suction on both the jaws gum and the dentures and they will adhere to each other and this suction will be rejuvenated every time the mouth closes.

It should be noted that the sheath manufactured with its vacuum suction cells (suckers) used in this patent can be produced using injection molding plastic sheath if made of very thin and very flexible plastic materials, then the sheaths will take any shape {vacuum suction the cells (suckers) will produce the same dental impression of the natural jaws gum and the same dental impression of acrylic denture of the lower shape due to the vacuum created} with the same suckers as described above and can be ready for wearing by any person but may have sizes, small, medium and large size to fit different size jaws aided by computer scan and may help in deciding the size needed or designing the shape of the injection molding sheath required.

The claimed invention is:
1. A lower denture comprising:
 a thin, flexible sheath including suckers on an upper surface of the thin, flexible sheath and suckers on a lower surface of the thin, flexible sheath, wherein the lower surface of the thin, flexible sheath is formed to match the shape of the jaw of the denture wearer, and wherein the upper surface of the thin, flexible sheath is formed to match the shape of bottom surface of a teeth portion of the lower denture;
 flat, straight gaps between the suckers on the upper surface of the think, flexible sheath;
 flat, straight gaps between the suckers on the lower surface of the thin, flexible sheath;
 wherein the suckers on the upper surface of the thin, flexible sheath alternate in position with the suckers on the lower surface of the thin, flexible sheath so that straight gaps on the upper surface of the thin, flexible sheath are located directly above the suckers on the lower surface of the thin, flexible sheath and the straight gaps on the lower surface of the thin, flexible sheath are located directly below the suckers on the upper surface of the thin, flexible sheath, and wherein the suckers on the upper surface of the thin, flexible sheath extend outwardly from a top surface of the thin, flexible sheath, and the suckers on the lower surface of the thin, flexible sheath extend into a cavity formed by the underside of the thin, flexible sheath.
2. The lower denture according to claim 1, wherein the suckers on the upper surface of the thin, flexible sheath and the suckers on the lower surface of the thin, flexible sheath adhere via suction to the lower jaw and the teeth portion, respectively, and wherein a natural chewing motion of the wearer will continuously rejuvenate the suction force of the suckers on the upper surface of the thin, flexible sheath and the suckers on the lower surface of the thin, flexible sheath.
3. An upper denture comprising:
 a thin, flexible sheath including suckers on an upper surface of the thin, flexible sheath and suckers on a lower surface of the thin, flexible sheath, wherein the upper surface of the thin, flexible sheath is formed to match the shape of the jaw of the denture wearer, and wherein the upper surface of the thin, flexible sheath is formed to match a shape of an upper surface of a teeth portion of the upper denture;

flat, straight gaps between the suckers on the upper surface of the thin, flexible sheath;

flat, straight gaps between the suckers on the lower surface of the thin, flexible sheath;

wherein the suckers on the upper surface of the thin, flexible sheath alternate in position with the suckers on the lower surface of the thin, flexible sheath so that straight gaps on the upper surface of the thin, flexible sheath are located directly above the suckers on the lower surface of the thin, flexible sheath and the straight gaps on the lower surface of the thin, flexible sheath are located directly below the suckers on the upper surface of the thin, flexible sheath, and wherein the suckers on the lower surface of the thin, flexible sheath extend outwardly from a lower surface of the thin, flexible sheath, and the suckers on the upper surface of the thin, flexible sheath extend into a cavity formed by the upper side of the thin, flexible sheath.

4. The upper denture according to claim 3, wherein the suckers on the upper surface of the thin, flexible sheath and the suckers on the lower surface of the thin, flexible sheath adhere via suction to the lower jaw and the teeth portion, respectively, and wherein a natural chewing motion of the wearer will continuously rejuvenate the suction force of the suckers on the upper surface of the thin, flexible sheath and the suckers on the lower surface of the thin, flexible sheath.

* * * * *